United States Patent [19]

Scoboria

[11] Patent Number: 4,641,861
[45] Date of Patent: Feb. 10, 1987

[54] FLEXIBLE JOINT FOR PIPES

[75] Inventor: Raymond Scoboria, Dearborn, Mich.

[73] Assignee: O.E.M. Technical Sales, Inc., Southfield, Mich.

[21] Appl. No.: 616,308

[22] Filed: Jun. 1, 1984

[51] Int. Cl.⁴ .................. F16L 21/02; F16L 27/04; F16L 37/24

[52] U.S. Cl. .................................. 285/39; 277/9; 277/30; 285/268; 285/376

[58] Field of Search .................. 277/1, 30, 204, 5, 9; 285/94, 263, 267, 268, 270, 271, 360, 361, 362, 376, 401, 402, 396, 276, 279, 39

[56] References Cited

U.S. PATENT DOCUMENTS

| | | | |
|---|---|---|---|
| 782,552 | 2/1905 | Glauber | 277/5 |
| 799,497 | 9/1905 | Robinson | 285/361 X |
| 919,743 | 4/1909 | Mason | 285/361 |
| 1,434,631 | 11/1922 | Reynolds | 285/267 X |
| 1,845,882 | 2/1932 | Litschge | 285/361 |
| 1,915,100 | 6/1933 | McLaughlin | 285/267 X |
| 2,265,267 | 12/1941 | Cowles | 285/402 X |
| 2,421,228 | 5/1947 | White | 285/361 X |
| 2,550,421 | 4/1951 | Mueller | 285/376 X |
| 3,698,744 | 10/1972 | Bevington | 285/376 X |
| 4,097,071 | 6/1978 | Crawford et al. | 285/94 |
| 4,313,626 | 2/1982 | Duncan | 285/402 X |

FOREIGN PATENT DOCUMENTS 811061 8/1951 Fed. Rep. of Germany ...... 285/362

Primary Examiner—Allan N. Shoap
Attorney, Agent, or Firm—Reising, Ethington, Barnard, Perry & Milton

[57] ABSTRACT

A flexible joint, especially adapted for pipes in an exhaust system of an engine is disclosed. A locking ring is disposed over a flared end of the first pipe and a stop flange and a slidable locking flange are provided on the second pipe with a wave spring disposed between them. A sealing ring having a spherical surface is seated against a sealing socket in the flared end of the first pipe. Complementary bayonet coupling members on the locking ring and on the locking flange, respectively, are provided whereby the joint may be assembled by pressing the locking ring and the locking flange together against the resistance of the wave spring and rotating them relative to each other to engage the bayonet coupling.

6 Claims, 9 Drawing Figures

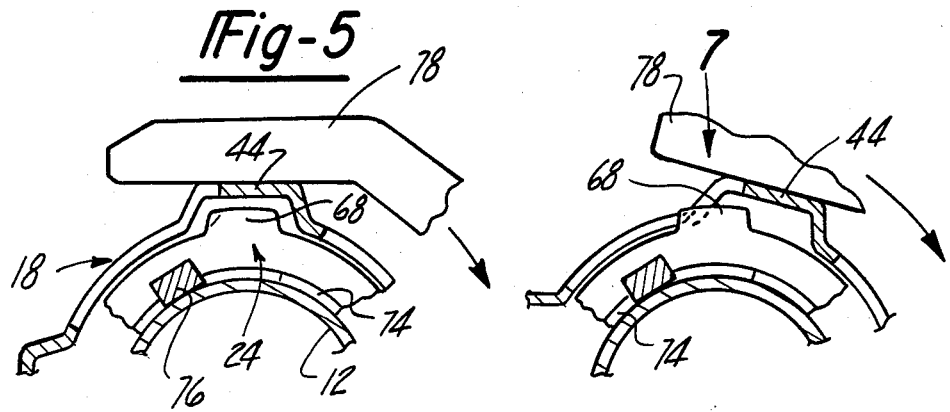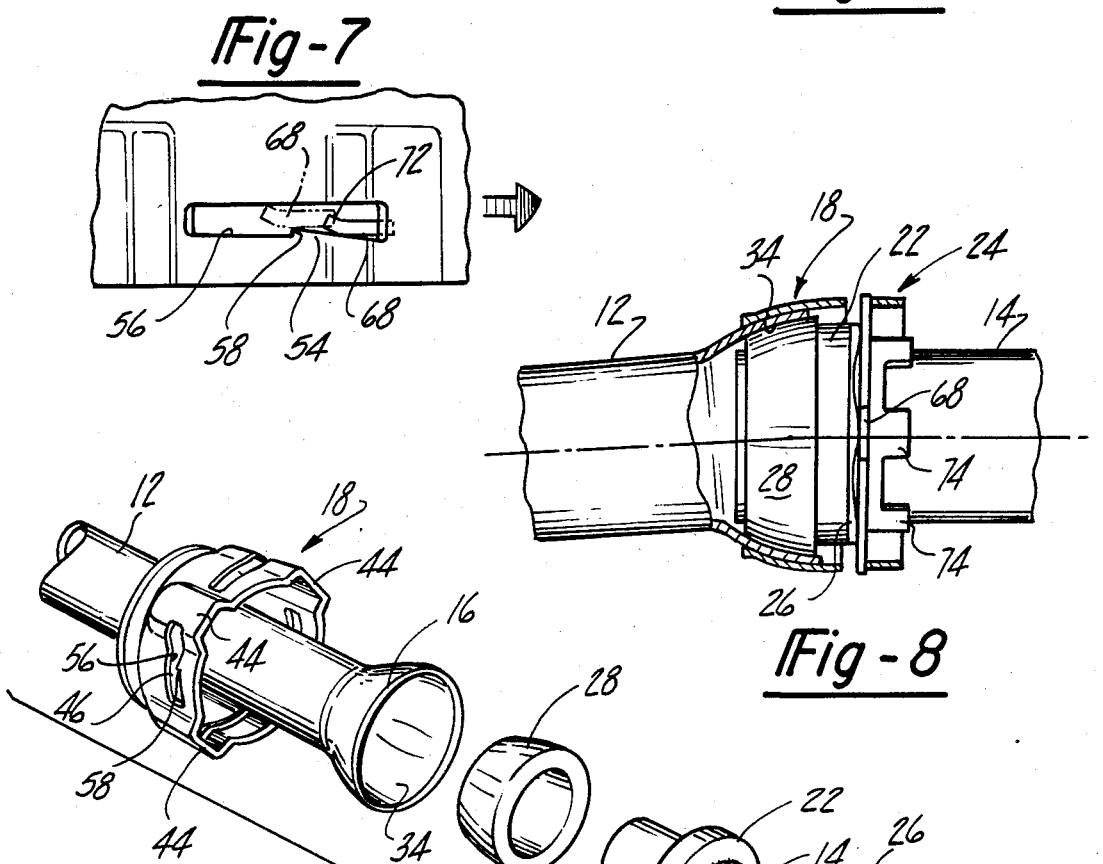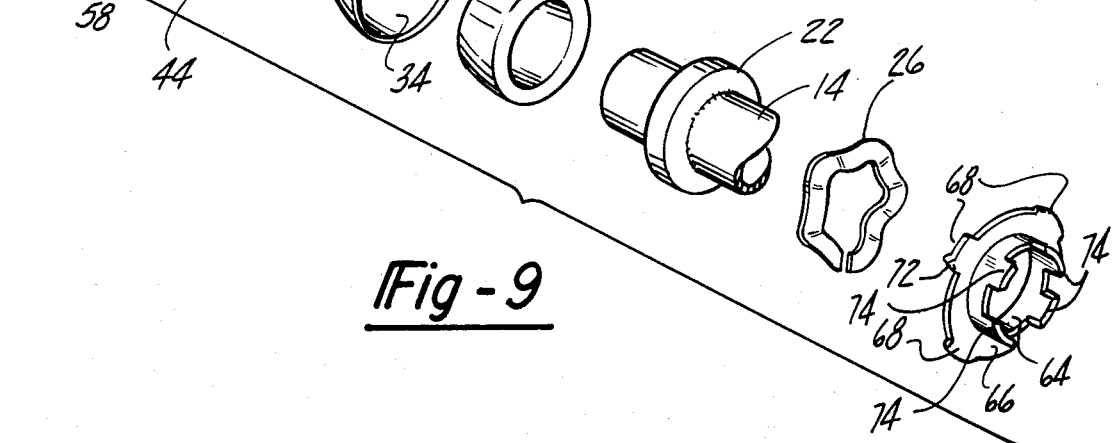

FLEXIBLE JOINT FOR PIPES

FIELD OF THE INVENTION

This invention relates to flexible pipe joints. It is especially adapted for joining pipes in an exhaust system of an engine driven vehicle but it is also useful in other applications.

BACKGROUND OF THE INVENTION

In exhaust systems of automobiles, the coupling or joint between the engine exhaust manifold and the catalytic converter is subjected to extreme physical conditions of temperature, vibration and flexure and twisting due to relative movement of the manifold and the catalytic converter inlet pipe. Additionally, the joint must meet stringent requirements in respect to sealing against exhaust gas leakage. Such a joint must also be of low cost and lightweight and have a long operating life to meet the needs of the automobile industry.

The foregoing requirements and the problems attendant thereto were specifically addressed in the making of the subject invention; however, it will be appreciated that the invention is useful in other applications even though not subject to the aforesaid requirements. For example, the invention could be used in other automotive applications such as the air supply pipe to the exhaust system and in nonautomotive applications such as piping systems for various fluids.

In the prior art, the Hall U.S. Pat. No. 4,209,177 discloses a flexible joint adapted especially for use in the exhaust system of an automobile. The joint of this patent utilizes a cast metal manifold with a flared end which receives a high temperature spherical seal on the end of the exhaust pipe, the seal being seated against an annular stop flange on the pipe. A clamping flange behind the stop flange is secured to a clamping flange on the flared end of the manifold by a pair of spring loaded bolts.

The Carr et al U.S. Pat. No. 3,995,889 discloses a pipe line ball joint for releasably connecting adjacent ends of two conduits. A ball member on one conduit is received by a socket member on the end of the other conduit and a ring mounted on the ball member is locked to the socket member by cooperating hooks and lugs which are engaged by relative rotation and held in place by lock pins.

The Laurent U.S. Pat. No. 2,158,131 discloses a swivel pipe coupling of the ball and socket type. In this its rear end which seats against a thrust ring bearing against a packing ring. The locking ring fits over the end of the socket member on the other pipe and has inwardly directed lugs with inclined faces adapted to cooperate with lugs on the socket member so that rotation of the locking ring forces the thrust ring against the packing ring toward the interior of the socket. The locking ring is held in its locked position by a bolt extending between the socket and the locking ring in a lateral direction. A coil spring is disclosed between the pair of packing rings to force the packing rings apart by a compressive force on the packing rings.

It is also known in the prior art to use an undulant spring in a connector for electrical conduits. In this connector, a receptacle shell and a plug shell are coupled together by a coupling ring having a locking ring inside thereof and disposed over the inner end of the plug shell. A first pair of bayonet pins extend through the coupling ring and through slots in the locking ring and into slots on the plug shell to hold these members together with a wave spring between the plug shell and the coupling ring. A second pair of bayonet pins are provided on the inner end of the receptacle shell which are in alignment with a pair of cam slots on the locking ring. When the plug shell is moved toward the receptacle shell, the second pair of bayonet pins engage the cam slots which causes rotation of the locking ring. This rotates the locking ring to a position where it is clear of the first pair of bayonet pins and the coupling ring is released thereby so that the spring pushes it toward the receptacle shell. This causes the first pair of bayonet pins to exert a force on the locking ring and rotate it relative to the plug shell. This rotation brings the second pair of bayonet pins into a locking relation with the cam slots so that the plug shell cannot be withdrawn from the receptacle shell.

A general objective of this invention is to provide an improved flexible joint for pipes which overcomes certain disadvantages of the prior art.

SUMMARY OF THE INVENTION

In accordance with this invention, a flexible joint especially adapted for pipes in an exhaust system of an engine is provided which can be manufactured and installed at low cost. It provides a good fluid seal while permitting flexure or angulation of the pipes over a wide angle and also permitting relative rotation of the pipes. Further, the flexible joint is capable of providing the desired fluid seal over a wide range of operating temperature. The flexible joint of this invention may be of relatively lightweight and yet provide a long service life without failure.

In accordance with this invention, a flexible joint of the ball and socket type is provided with a bayonet coupling under spring load exerted between the pipes to maintain a seal member in the ball and socket under compression over a wide range of angulation of the pipes.

In accordance with this invention, a flexible joint is provided which comprises a locking ring disposed over a flared end of a first pipe, a stop flange and a slidable locking flange on a second pipe and a compressable resilient member disposed therebetween. A sealing ring having a spherical surface is seated against a sealing socket in the flared end of the first pipe. Complementary bayonet coupling members on said locking ring and said locking flange, respectively, are provided whereby the joint may be assembled by pressing the locking ring and locking flange together against resistance of the resilient member and rotating them relative to each other to engage the bayonet coupling. Further, in accordance with this invention, the resilient member is a wave spring. Further, one of the bayonet coupling members includes a plurality of circumferentially spaced channel-shaped sectors on the locking ring with a cam slot extending laterally from each sector; the other bayonet coupling member includes a plurality of circumferentially spaced teeth extending radially from said locking flange and adapted to enter the channel-shaped sectors and seat in said slots. Further, each of the slots has a ramp edge for causing axial movement of the respective tooth during rotative movement of the coupling members and has a notch adjacent the ramp to trap the tooth in its rotative position. Further, the channel-shaped sectors are provided with tool engaging surfaces and the locking flange is provided with tool engaging teeth for use in assembly and disassembly of the joint.

A more complete understanding of this invention may be obtained from the description that follows taken with the accompanying drawings.

DESCRIPTION OF THE DRAWINGS

FIG. 5 is a fragmentary view showing the joint in a preliminary stage of assembly;

FIG. 6 is a fragmentary view of the joint in an intermediate stage of assembly;

FIG. 7 is a fragmentary view taken on the direction line 7 of FIG. 6;

FIG. 8 shows the assembled flexible joint in a flexed or angulated condition; and FIG. 9 is an exploded view showing the parts of the flexible joint.

BEST MOST FOR CARRYING OUT THE INVENTION

Figure 1:
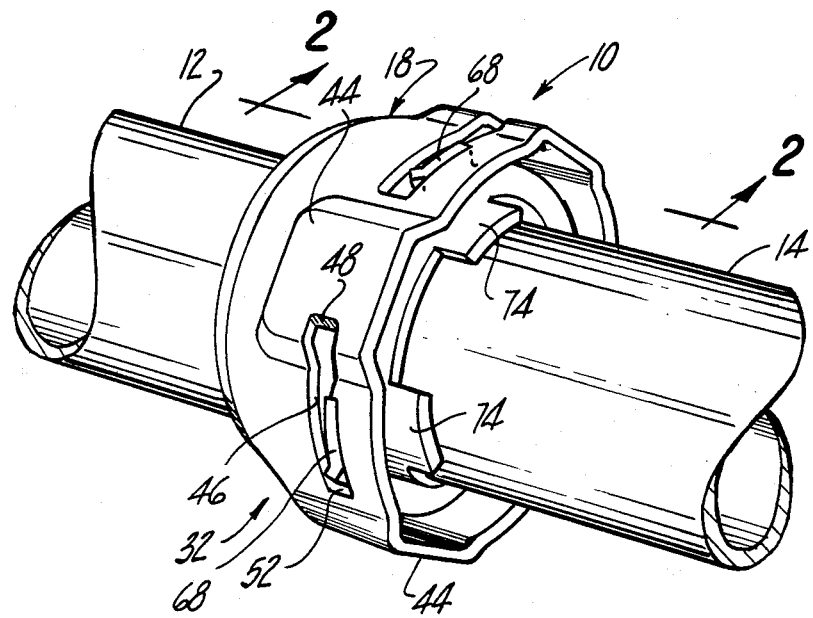
FIG. 1 is a perspective view of the flexible joint of this invention in its assembled condition.

Referring now to the drawings, there is shown an illustrative embodiment of the invention in a flexible joint for use in the exhaust system of an automotive vehicle. In this embodiment, the joint is used to connect a sheet metal exhaust manifold to the inlet pipe of a catalytic converter. As such, it provides a relatively high degree of flexibility or angulation of the pipes while maintaining a seal against exhaust gas leakage and withstanding the very high temperature environment in such an application. It will be appreciated as the description proceeds that the invention is useful in other applications and embodiments.

Figure 2:
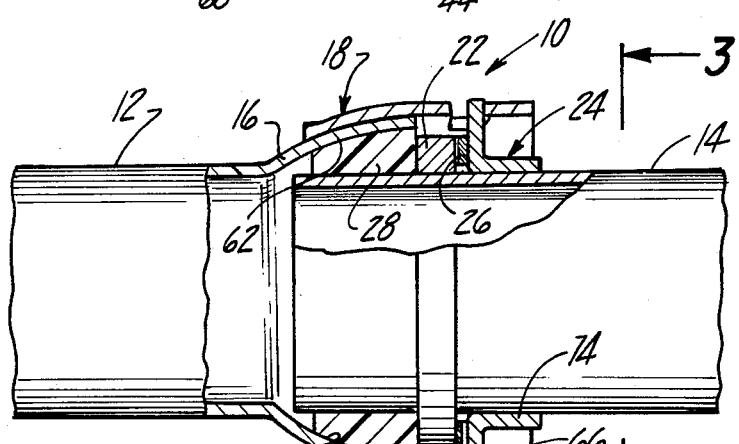
FIG. 2 is a view partially in section taken on line 2—2 of FIG. 1.
Figure 3:
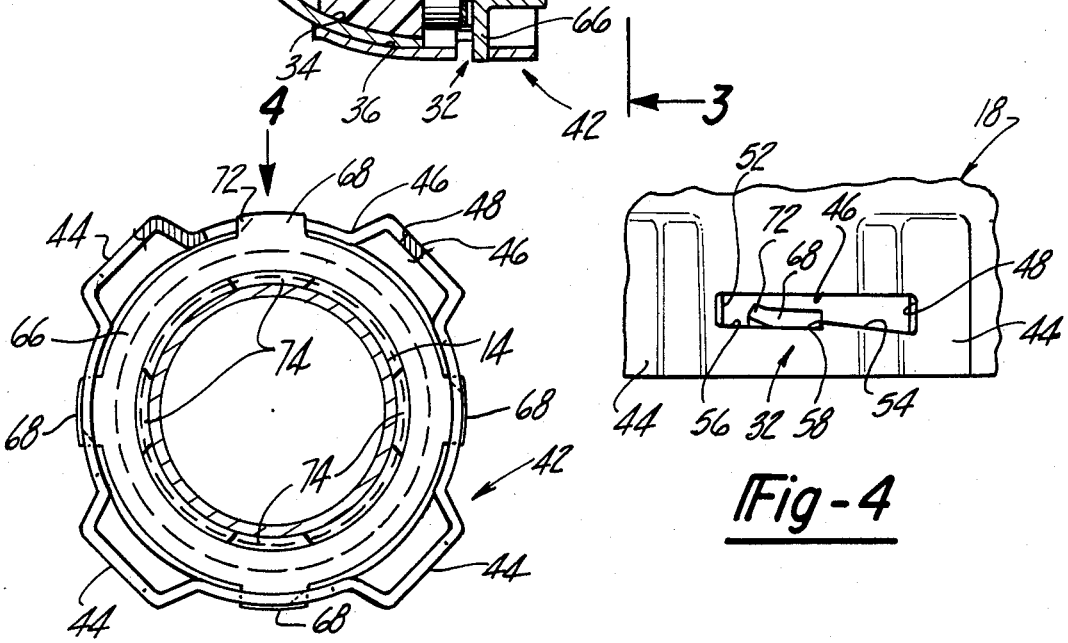
FIG. 3 is a view taken on lines 3—3 of FIG. 2.
Figure 4:
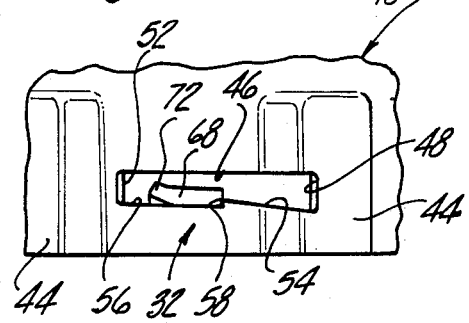
FIG. 4 is a fragmentary view taken on the direction line 4 of FIG. 3.

The flexible joint of this invention is shown in its assembled condition in FIGS. 1 through 4. The flexible joint 10 as shown connects an outlet pipe 14 of an exhaust manifold (not shown) to an inlet pipe 12 of a catalytic converter (not shown). The coupling 10 comprises in general, a flared end 16 on the end of pipe 12 and a locking ring 18 disposed thereover. The pipe 14 is provided with a stop flange 22, a locking flange 24 and a wave spring 26 therebetween. A sealing ring 28 is disposed on the free end of the pipe 14 within the flared end 16. The locking ring 18 and the locking flange 24 are interlocked by a bayonet coupling 32.

The flexible joint will now be described in greater detail. The flared end 16 of the pipe 12 is provided with a sealing socket 34 which includes a portion having a spherical curvature. The locking ring 18 has a socket portion 36 which is seated on the exterior surface of the flared end 16 to form a ball and socket connection therewith. This ball and socket connection is adapted to permit relative angular movement but it does not have the purpose of forming a gas tight seal, as will be discussed subsequently. The locking ring 18 includes, at its forward and, a first bayonet coupling member 42. The bayonet coupling member 42 comprises a set of four channel-shaped sectors 44 which are unitary with the body of the locking ring 18. Each channel-shaped sector 44 is open at the front end and terminates in a closed rear end. A locking slot 46 in the wall of the coupling member 42 extends from each of the channel-shaped sectors 44 in a circumferential direction. It is noted that each locking slot 46 extends from a first end 48 in the top wall of the channel-shaped sector 44 to a second end 52 adjacent the side wall of the adjoining channel-shaped sector 44. The front edge of each locking slot 46 defines a ramp 54 starting at the first end 48 and it also defines a notch 56 separated from the high end of the ramp 54 by a shoulder 58. The other member of the bayonet coupling 32 is mounted on pipe 14, as will be described subsequently.

The subassembly mounted on pipe 14 will now be described. The stop flange 22 is an annular steel body with a rectangular cross-section and is welded onto the pipe 14 at a location spaced from the free end of the pipe. The sealing ring 28 fits over the free end of the pipe 14 and the rear axial face thereof seats against the axial face of the stop flange 22. The sealing ring 28 is provided with a convex spherical surface 62 which mates with the surface of the sealing socket 34 on the flared end 16 of pipe 12. The surface of the sealing socket 34 is spherical with substantially the same radius as surface 62; however, it will be appreciated that the socket surface could be of larger radius or of other curvature or conical and a line contact would be achieved for the seal. Thus, the mating spherical surfaces 62 and 34 coact as a ball and socket connection which allows relative angular freedom of movement of the pipes 12 and 14 while maintaining the surface-to-surface sealing engagement. The sealing ring 28 is of a known type comprising a refractory material in a wire mesh which is processed to provide a unified structure capable of providing excellent sealing properties over a wide range of temperatures including the high temperature of a vehicle engine exhaust system adjacent the catalytic converter. Such a high temperature sealing ring is described in the Hall U.S. Pat. No. 4,209,177.

The locking flange 24 comprises a sleeve 64 and the second bayonet coupling member 66 in the form of a radial flange. The sleeve 64 is slidably mounted on the pipe 14. As will be described presently, the second bayonet coupling member 66 is complementary with the first bayonet coupling member 42. The wave spring 26 is disposed between the second bayonet coupling member 66 and the stop flange 22. The wave spring 26 is of conventional structure and comprises a split washer of spring metal having a plurality of axial undulations or wave patterns distributed circumferentially of the washer. The bayonet coupling member 66 on the locking flange 24 is provided with a set of circumferentially spaced radially extending teeth 68. The teeth 68 are spaced correspondingly with the circumferential spacing of the channel-shaped sectors 44, respectively, on the locking ring 18. The width end radial length of each tooth 68 is such that it will fit within the corresponding channel-shaped sector 44; however, the radial length of each tooth 68 is greater than the radius of the sleeve section of the first bayonet coupling member 42 so that the tooth will extend through its corresponding locking slot 46 when the joint is assembled. To facilitate the entry and rotation of each tooth 68 into its corresponding slot at the ramp 54, the tooth is provided with a bent corner 72 on the leading edge of the tooth. The trailing edge of the tooth is substantially rectangular so that it will seat against the shoulder 58 between the ramp 54 and notch 56.

To facilitate assembly of the flexible joint 10, as will be described presently, the sleeve 64 of the locking flange 24 is provided with a set of four axially extending teeth 74. The teeth 74 are adapted to be engaged by a tool which will apply torque and axial force to the locking flange 24. Also, for the purpose of facilitating the assembly of the flexible joint, the outer walls of the channel-shaped sectors 44 on the locking ring 18 are flat and of sufficient width to receive a tool, such as a spanner wrench for applying torque and axial force to the locking ring 18.

The assembly of the flexible joint 10 will now be described, primarily with reference to FIGS. 5, 6 and 7. As shown in FIG. 5, the pipes 12 and 14 are aligned and the locking flange 24 and the locking ring 18 are oriented so that the teeth 68 are in axial alignment with the respective channel-shaped sectors 44. The holding tool having a set of lugs 76 (only one shown) is engaged with the teeth 74 of the locking flange 24. A torque tool having jaws 78 (only one shown) is engaged with one opposite pair of channel-shaped sectors 44. The locking ring 18 and the locking flange 24 are pressed toward each other in the axial direction to permit the locking teeth 68 to enter the channel-shaped sectors 44 slightly beyond the front edge of the locking slots 46, i.e. so that each tooth is opposite the first end 48 of its respective slot. The locking ring 18 is rotated relative to the locking flange 24, the rotation being in a clockwise direction as viewed in FIGS. 5 and 6. As shown in FIGS. 6 and 7, the locking teeth 68 are thereby advanced so that the front face of each tooth engages the ramp 54. Continued relative rotation as shown by the phantom lines in FIG. 7 causes each tooth to ride up the ramp 54 and thus causing increased compression of the wave spring 26. When the trailing edge of each tooth 68 passes the shoulder 58 it will retract under the influence of the wave spring into the notch 56. Thus, the locking teeth 68 are trapped in the notch 56 against counter rotation which would tend to permit inadvertent uncoupling of the joint. When it is desired to disassemble the joint, it may be necessary to apply an axial force to move the locking teeth 68 to clear the shoulder 58. Then the locking ring 18 and the locking flange 24 are relatively rotated so that the locking teeth 68 move through the respective slots 46 to the channel-shaped sector 44 whereby the parts can be axially separated. The bayonet coupling in the illustrative embodiment is joined in the manner of a left hand thread; it will be apparent that a right hand thread may be used instead.

As illustrated in FIG. 8, the flexible joint 10 is capable of permitting relative angular motion of the pipes 12 and 14. When a force tending to cause such angulation is applied to the pipes, the sealing ring 28 is rotated in the spherical sealing socket 34 since it is supported in a rigid manner on the end of the pipe 14. As a result of such rotation, forces are transmitted from the stop flange 22 through the wave spring 26 to the locking flange 24 and thence to the locking ring. The spring 26 has sufficient stiffness so that the stop flange 22 and locking flange 24 remain substantially parallel during such rotation. The sealing ring 28 is urged by the spring 26 with constant force into sealing engagement with the sealing socket 34. Thus, the flexible joint maintains a uniformly tight seal over a wide range of angulation of the joint. Further, the seal is maintained when the pipes undergo relative axial rotation.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. A flexible joint for pipes, said joint comprising:
   a first pipe having a flared end with a curvature forming a sealing socket,
   a locking ring disposed over said flared end and having a socket portion angularly movable on the outside of said flared end, said locking ring having a first bayonet coupling member thereon,
   a second pipe having a free end,
   a locking flange rotatably and slideably disposed on the outside of said second pipe and having a second bayonet coupling member thereon,
   retaining means on said second pipe between the free end thereof and said locking flange for preventing said locking flange from moving beyond a predetermined position on said second pipe toward the free end of said second pipe,
   a sealing ring disposed on said second pipe between the free end thereof and said locking flange, said sealing ring having a surface seated in and corresponding in shape to said sealing socket,
   and a compressible resilient member disposed within the confines of said locking ring between said locking flange and said retaining means,
   said bayonet coupling members being complementary to and engageable with each other whereby said joint may be assembled and disassembled by aligning said coupling members, pressing said locking ring and said locking flange together against the resistance of said resilient member and rotating them relative to each other.

2. The invention as defined in claim 1 wherein said retaining means comprises an annular stop flange fixedly mounted on said second pipe between said locking flange and said sealing ring, said resilient member being disposed between said stop flange and said locking flange.

3. The invention as defined in claim 1 wherein said resilient member is a wave spring.

4. The invention as defined in claim 1 wherein:
   said first bayonet coupling member includes a plurality of circumferentially spaced channel-shaped sectors on said locking ring and a slot extending laterally from each sector,
   and said second bayonet coupling member includes a plurality of circumferentially spaced teeth extending radially from said locking flange, said teeth being adapted to enter said channel-shaped sectors and to seat in said slots by relative axial and rotative movement of the coupling members.

5. The invention as defined in claim 4 wherein each of said slots has a front edge defining a ramp for causing axial movement of the respective tooth during said rotative movement and defining a notch adjacent said ramp to trap said tooth in its rotative position 6. The invention as defined in claim 5 wherein said channel-shaped sectors have substantially flat outer surfaces for engagement by a tool, and said locking flange includes plural axially extending teeth for engagement by a tool.

* * * * *